Patented Oct. 20, 1925.

1,558,069

UNITED STATES PATENT OFFICE.

FRED D. WILLIAMS, OF COOPERSTOWN, NORTH DAKOTA.

PROCESS OF MAKING COOKING COMPOUND.

No Drawing.    Application filed February 15, 1923.   Serial No. 619,268.

*To all whom it may concern:*

Be it known that I, FRED D. WILLIAMS, a citizen of the United States, residing at Cooperstown, in the county of Griggs and State of North Dakota, have invented a new and useful Improvement in Processes of Making Cooking Compound, of which the following is a specification.

My invention relates to the production of a cooking compound which is particularly adapted to be used in place of lard, crisco or other animal or vegetable fats for the purpose of shortening.

One object of the invention is to produce a compound of this nature to be used in making bread, fried cakes, cookies or the like, which will have all the desirable properties of the shortening compounds hitherto used, and will at the same time produce a more convenient and more palatable food product.

Another object of the invention is to produce a shortening compound which, in addition to the desirable qualities, above set forth, may be kept indefinitely without becoming rancid or otherwise losing its superior quality.

The compound to which my invention relates consists of strained honey in the liquid state mixed with lard or other fatty substance suitable for shortening purposes. The ingredients may be mixed in different proportions, depending upon the particular purpose for which it is to be used, as well as the individual taste. The most desirable product is obtained by using approximately equal parts of the two ingredients.

In order that the two ingredients may be thoroughly mixed so as to result in a homogeneous and uniform product, I prefer to cool the honey nearly to the point where it would become granulated, at the same time warming the lard or other fatty compound until it may be easily stirred. The two ingredients are then stirred together with beaters or in a revolving barrel until they form an intimate or substantially homogeneous mixture, in which each tiny particle of fat is permeated and coated with honey. The resulting mixture is, in fact an emulsion of pasty consistency.

In the compound thus produced, the fat is protected from the air, and may, therefore, be kept for an indefinite time without becoming rancid. It will, therefore, always be in condition to produce the best results in cooking, while the honey results in a product of better appearance and more pleasing taste. The use of my compound will also eliminate the necessity of sugar for sweetening and thereby simplify the cooking process.

While I have mentioned honey and lard as ingredients of my improved compound, it will be understood that these are merely for the purpose of exemplification, and that other equivalent substances may be substituted therefor.

What is claimed is:—

1. A process for mixing honey with a fatty substance, which consists in cooling the honey nearly to the granulation point and warming the fatty substance until it may be easily stirred, and then thoroughly mixing the two ingredients together by stirring until they form, in effect, an emulsion of pasty consistency.

2. A process for mixing honey with a fatty food compound, which consists in cooling the honey nearly to the granulation point and warming the fatty compound until it may be easily stirred, and then thoroughly mixing substantially equal parts of the two ingredients together by stirring to form an intimate and uniform mixture in which each particle of the fatty compound is thoroughly permeated with and covered by the honey and thereby protected against the air.

In testimony, that I claim the foregoing as my own, I have hereto affixed my signature.

FRED D. WILLIAMS.